United States Patent [19]

Blandy et al.

[11] Patent Number: 5,317,754
[45] Date of Patent: May 31, 1994

[54] METHOD AND APPARATUS FOR ENABLING AN INTERPRETIVE EXECUTION SUBSET

[75] Inventors: Geoffrey O. Blandy, Vestal; Lisa C. Heller, Saugerties; Robert E. Murray, Woodstock, all of N.Y.

[73] Assignee: International Business Machines Corporation, Armonk, N.Y.

[21] Appl. No.: 602,029

[22] Filed: Oct. 23, 1990

[51] Int. Cl.$^5$ ............................................. G06F 9/46
[52] U.S. Cl. ................................. 395/800; 364/228.2; 364/246.2; 364/246.3; 364/256.4; 364/DIG. 1
[58] Field of Search ........................ 395/400, 800, 375

[56] References Cited

U.S. PATENT DOCUMENTS

| | | | |
|---|---|---|---|
| 4,456,954 | 6/1984 | Bullions et al. | |
| 4,792,895 | 12/1988 | Tallman | |
| 4,816,991 | 3/1989 | Watanabe et al. | 395/400 |
| 4,885,681 | 12/1989 | Umeno et al. | 395/700 |
| 5,077,654 | 12/1991 | Ohtsuki | 395/800 |
| 5,088,031 | 2/1992 | Takasaki et al. | 395/400 |
| 5,109,489 | 4/1992 | Umeno | 395/275 |
| 5,129,071 | 7/1992 | Yamagata et al. | 395/400 |

Primary Examiner—Parshotam S. Lall
Assistant Examiner—Ayni Mohamed
Attorney, Agent, or Firm—Bernard M. Goldman

[57] ABSTRACT

An apparatus and method are established for recognizing guest virtual machines which require only a subset of interpretive execution facilities. The interpretive execution initialization process recognizes subset candidates and bypasses initialization of those facilities not required by the candidates. The candidates are typically short duration jobs and a reduction of initialization and termination overhead creates a substantial performance improvement. The translation lookaside buffer operation is modified to flag subset guest entries as host entries and to associate a unique segment table origin with each subset guest. This allows the TLB entries to remain between guest machine dispatches eliminating TLB purge time and allowing potential reuse of TLB entries if the same guest is repeatedly dispatched within a short time period. The guest machine state description is modified to flag subset guest candidates based on address translation and timing requirements. Initialization of timing facilities is bypassed in certain subset modes further reducing initialization overhead.

5 Claims, 6 Drawing Sheets

METHOD AND APPARATUS FOR ENABLING AN INTERPRETIVE EXECUTION SUBSET

BACKGROUND OF THE INVENTION

1. Field of the invention

The present invention relates to computer systems, and more particularly, to virtual machine systems which provide for instruction processing in multiple levels of virtual machines. More particularly, this invention relates to efficient emulation of one or more guest architectures in a multi-programmable computer system to improve the performance of the system when executing plural levels of operating systems.

2. Description of the Prior Art

Mainframe computer systems such as the IBM 3090 computer system comprise a plurality of processors and large random access and sequential access storage devices. These large systems are capable of processing a large number of tasks in a short period of time. It is frequently desirable to divide this host processing power into separate partitions or "virtual machines" that can be operated by different users. The division is accomplished by the use of host control program software such as the IBM Virtual Machine/Extended Architecture (VM/XA) system product or a facility such as the IBM PR/SM hardware partitioning feature. Each of the virtual machines defined above can accept a "guest" operating system that may be different from the host operating system. Thus, for example, if the host is running the VM/XA operating system, the guest could operate the IBM MVS/XA system program. The guest virtual machines may in turn be divided into additional virtual machines for performance of certain tasks.

The host control program or operating system is typically referred to as the host and the guest operating on the host is the guest. Guest programs believe they are causing a real access to a processor or memory. The IBM System/370 architecture manages this through a process known as interpretive execution of the virtual machine instructions. The System/370 architecture is described in the IBM Publication GA22-7000. The IBM System/370-XA implementation of interpretive execution is described in IBM Publication SA22-7095.

Interpretive execution requires the translation of instructions and addresses from the guest machine to the underlying real machine and real storage. An example of the translations required is the translation of memory addresses from the guest machine to real storage. U.S. Pat. No. 4,456,954, issued on Jun. 26, 1984 and assigned to the assignee of this application, describes interpretive execution and address translation under interpretive execution and is incorporated herein by reference.

The host machine initiates a guest program through a Start Interpretive Execution (SIE) instruction. The SIE instruction invokes interpretive execution hardware in the host causing the host to enter interpretive execution mode for executing the guest. SIE provides for the mapping of addresses by the guest virtual machine.

Each virtual machine to be operated as a guest of the host machine is described in a state description maintained in real storage. When an SIE instruction is encountered, the state description is used to establish the virtual machine environment for execution., At the same time, the existing host environment must be saved so it can be restored upon exit from the virtual machine. Upon completion of the SIE instruction (including running of the guest), the current status of the guest virtual machine must be stored in the state description and the previous host environment restored to the real machine. This saving and restoring control information creates a large amount of overhead which is particularly harmful to performance when the actual execution time for the guest virtual machine is relatively short.

Among the interpretive execution facilities are dynamic address translation and guest timing services. Dynamic address translation is the process which translates a guest virtual address into a host real address allowing access to the real storage in the machine. The IBM System/370 employs a virtual memory mechanism in which real memory is divided into pages of a constant size, e.g., 4K bytes, which are addressed by segment and page indices. The virtual address of a memory location will be represented as a segment table index value, a page table index value, and a displacement within the page. To locate the actual data, the segment table, page table, and memory page must each be accessed. If the virtual address is specified in a guest operating system, the address that guest believes to be a real address must be further translated by the lower level guests and the host machine. As a result, several steps of address translation must occur as shown by the arrows in FIG. 4a.

Address translation can be made more efficient by the use of a translation lookaside buffer (TLB). The translation lookaside buffer captures the results of dynamic address translation and provides a shortcut for future guest address translations. The TLB has a limited capacity, so only a certain number of recent translations are maintained (e.g., 512). The System/370 hardware provides the ability to test whether or not a translation from virtual to real for the virtual address request is available in the TLB. If the translation is available, it is used and dynamic address translation is bypassed. This can result in significant time savings. The translation lookaside buffer maintains several pieces of information including an indicator of whether the entry is for the host system or a guest, the logical address translated (representing a guest virtual or guest real address), the real address that resulted from the translation, and the segment table origin (STO) address of the logical address.

A second facility provided by interpretive execution is guest timing. The System/370 architecture provides host timing facilities including a clock comparator, CPU timer and time-of-day (TOD) clock. The host operating system can measure differences in time by simply comparing the clock at different points in time. Guest operating systems, however, must account for the periods of time when a different guest has control of the real machine resources. This accounting involves the maintenance of timing intervals and timing comparators. This interpretive execution facility also creates high overhead particularly where the interpretive execution guest machine is operating only for short periods of time.

SUMMARY OF THE INVENTION

The present invention is directed to providing a method and apparatus for more efficiently operating guest virtual machines on a host system. The invention is directed to providing the ability to identify virtual machines requiring only a portion of the interpretive execution facilities and causing the interpretive execution entry and exit processing to bypass processing of unused facilities. The present invention is also directed to more efficient use of the translation lookaside buffer for subset guests by allowing guest entries to remain in the TLB for potential reuse if the subset virtual machine is redispatched within a short time.

DESCRIPTION OF THE PREFERRED EMBODIMENT

Figure 1:
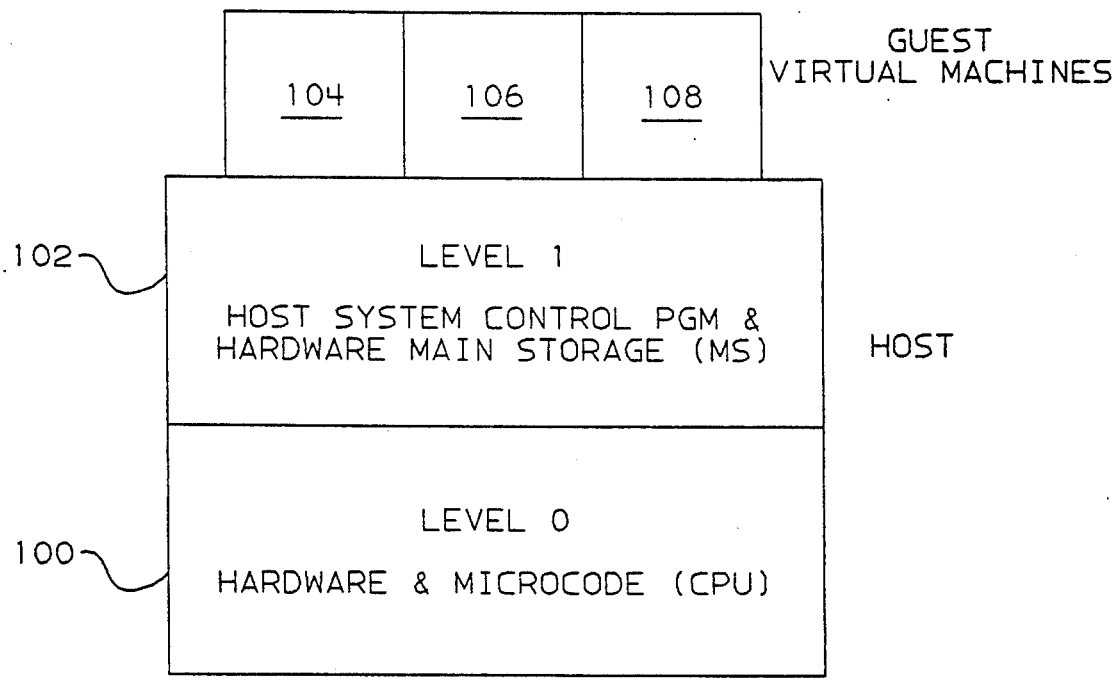
FIG. 1 is a block diagram showing the logical relationships between the real CPU and plural levels of guest virtual machines.

FIG. 1 shows the logical structure of a computer operating according to the present invention. The real processing unit or CPU is level 0 of the structure 100. The processing unit can comprise one or more processors. Level 1 comprises the host system control programs and hardware main storage (MS) 102. The host system control program can be a program such as the IBM VM/XA system product or VM/ESA system product. Virtual machines are created on top of this host system as guest machines 104, 106 and 108. Although three machines have been shown, the number of possible machines is limited only by the architecture, CPU and main storage configurations.

Figure 2:
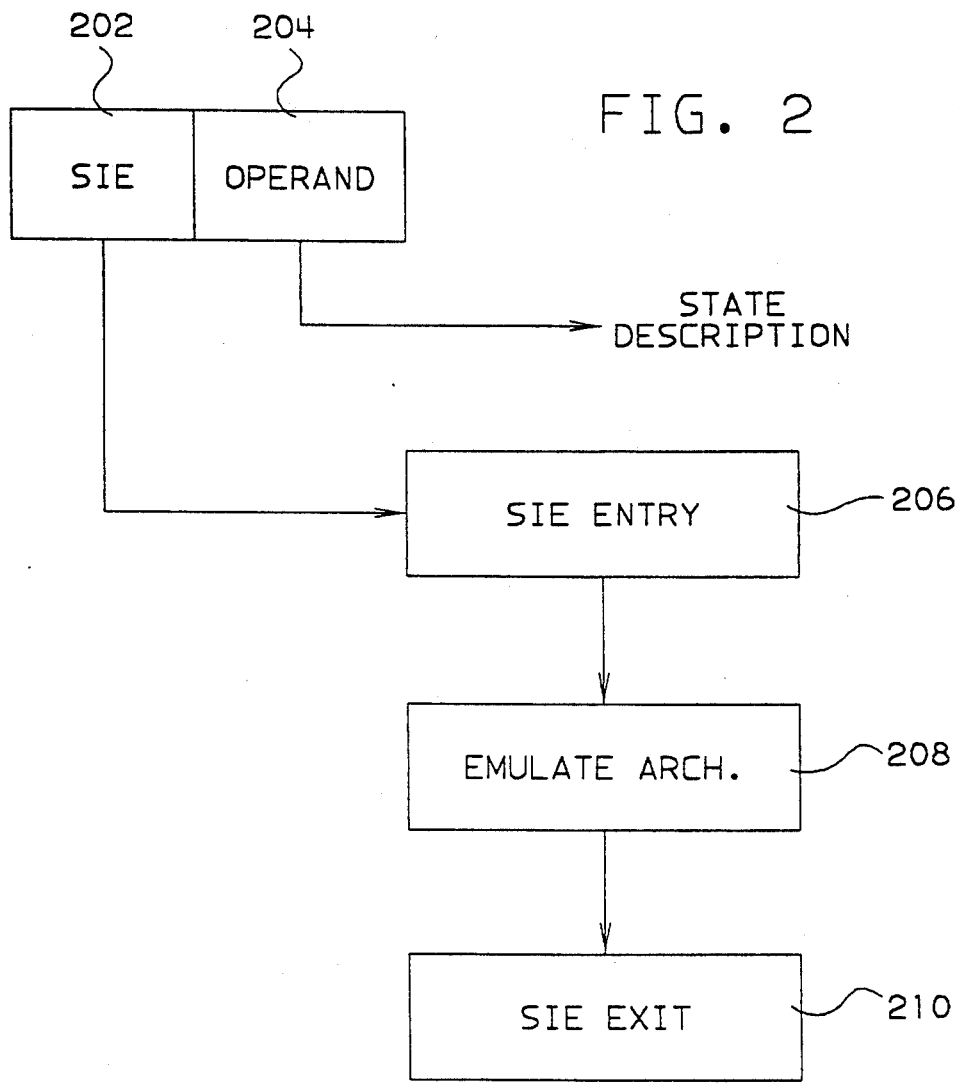
FIG. 2 is a flowchart showing the steps performed upon entry to interpretive execution mode.

As discussed above, higher levels of virtual machines are created through the use of the start interpretive execution (SIE) instruction. As shown in FIG. 2, SIE instruction comprises an opcode (i.e., SIE) 202 and an operand 204. Operand 204 is a pointer to the state description for the requested machine. When the host system encounters the SIE instruction in its instruction stream, the machine begins the process of establishing the SIE environment. This occurs through step 206 SIE entry. Once established, the virtual machine operates by emulation as shown at 208. Finally, when the virtual machine task is completed, or is interrupted while waiting for an external event, such as input or output, the SIE environment is exited through SIE exit 210 and processing returns to the host instruction stream. The preferred embodiment of the present invention implements the described logic using microcode. The invention is not limited to such an implementation, however, and implementations in hardware, microcode or any combination are within the scope of this invention.

Figure 3:
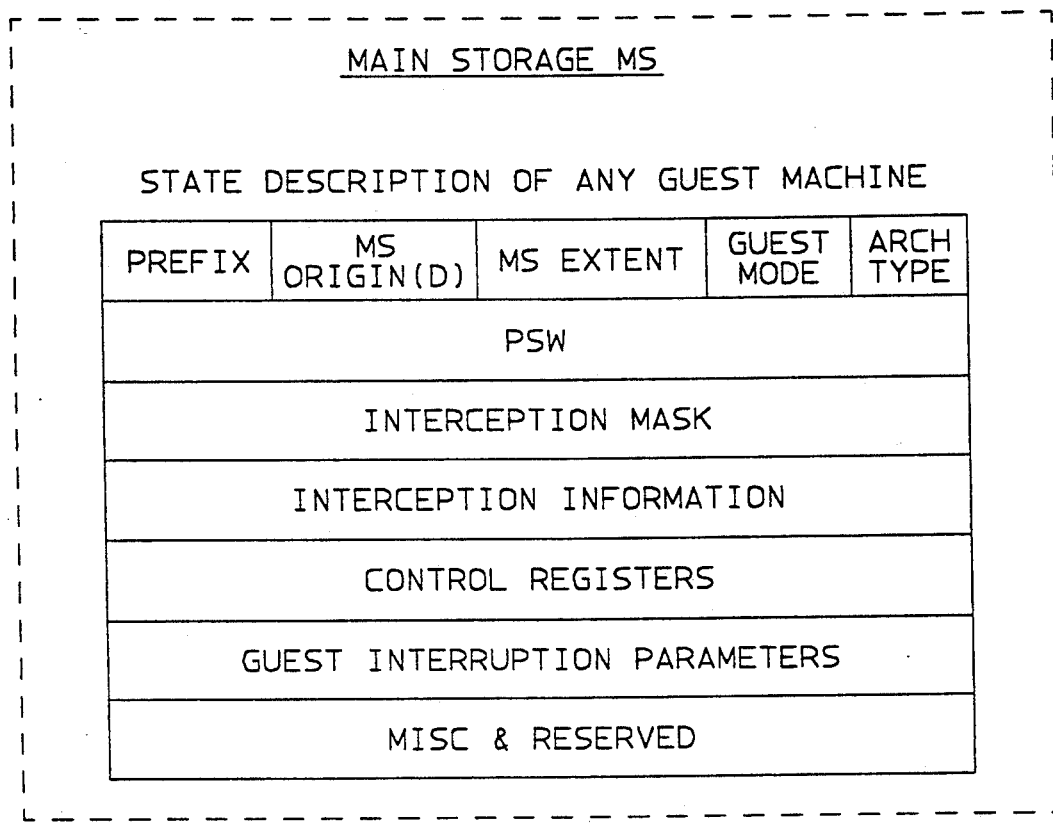
FIG. 3 is an example of a main storage state description.

SIE entry involves saving the host environment parameters and loading the guest parameters from a state description of the guest machine. An example of a state description of a guest machine is shown in FIG. 3.

Figure 5:
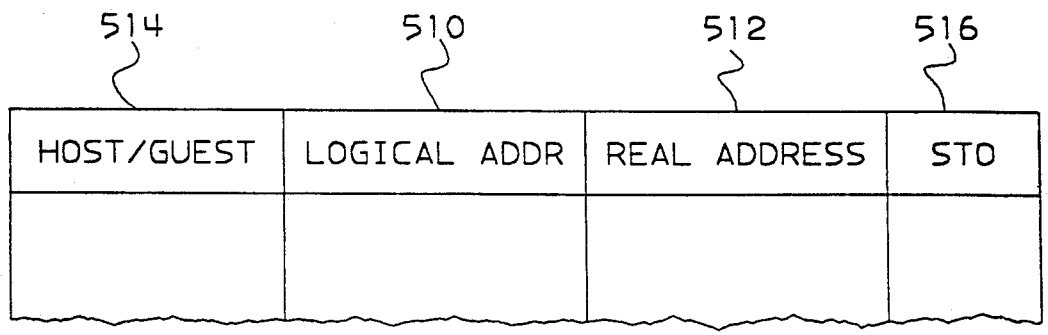
FIG. 5 is an example layout of the translation lookaside buffer.

Address translation, as discussed above, is a process of converting a guest address into an absolute host address so that physical main storage can be accessed. FIG. 4A shows the flow of typical dynamic address translation in a guest virtual machine. The TLB entry created as a result of this address translation is shown in FIG. 5. A TLB entry comprises a guest logical address 510, the address to be translated. The logical address is a guest virtual address for machines running with DAT on. It is a guest real address (a host virtual address) for machines running with DAT off. The TLB also contains the real address 512 associated with the address 510 and resulting from dynamic address translation. Associated with the virtual address is a host or guest indicator 514 that indicates whether the logical address is a host or guest address. The segment table origin for that logical address is also stored at 516 and can be compared with the segment table origin of the address to be translated to ensure that it is in fact the same address.

Figure 4B:
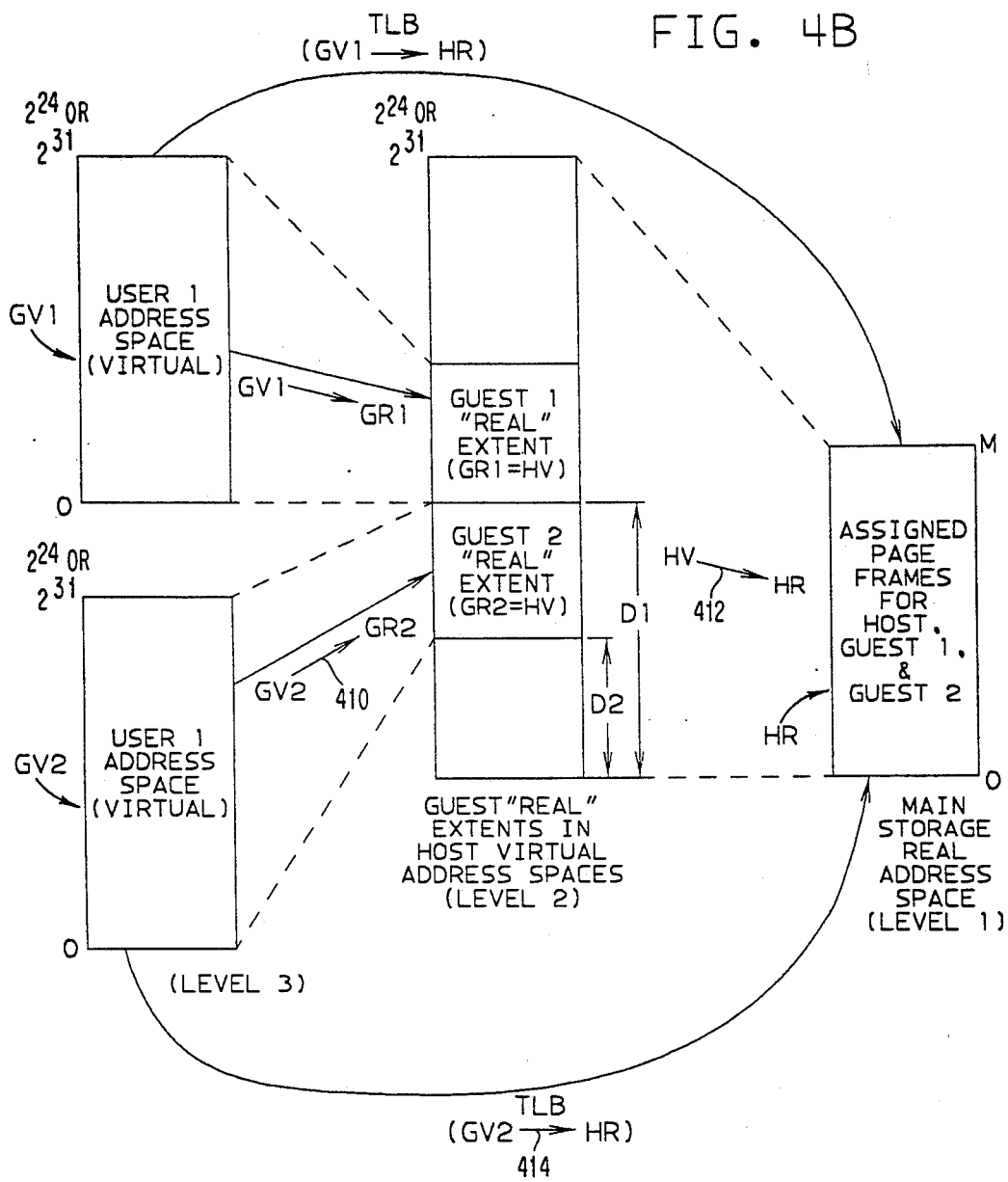
FIG. 4B is a diagram illustrating the shortcuts possible through the use of TLB.
Figure 4A:
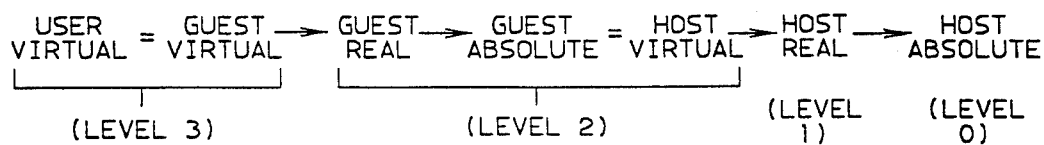
FIG. 4A is an example of address translation.

The TLB allows more rapid main storage addressing as shown in FIG. 4B. While a guest virtual address to host absolute address translation proceeds through at least two translation steps 410 and 412, the TLB allows a direct translation from guest virtual to host real 414 in one step. The reduction of translation steps reduces the number of memory accesses required during translation. These accesses include at least accessing the segment table based upon the segment table origin and segment index, accessing the page table based upon the information from the segment table and the page index, and accessing the segment table entry based upon page table information and address displacement.

The present invention is directed to providing the apparatus and method to recognize guest virtual machines that do not require all interpretive execution facilities, and to establishing only those facilities required by that guest machine. Certain guest machines require fewer services. For example, the IBM Conversational Monitor System (CMS) program product allows a computer user to conduct interactive (conversational) sessions with the computer system. CMS operates as a separate guest virtual machine for each computer user and runs instructions necessary to carry out the requested tasks. By its nature, CMS runs short tasks so the overhead associated with SIE entry and exit consumes a significant percentage of the task's active time. CMS typically does not require the use of timing facilities and runs with guest dynamic address translation turned off (DAT off). Thus, a CMS guest can be run without enabling these interpretive execution facilities.

The preferred embodiment of the present invention operates with a guest machine state description modified to include two additional indicators for indicating whether dynamic address translation (DAT) or timing are required. The host program initially sets these indicators to identify an SIE subset candidate. If the newly created virtual machine attempts to use a proscribed facility, the host detects the violation, turns off the indicators, and causes the guest to be redispatched. The directory entry for certain guests contains information that causes the host to dispatch the guest with the initial indicators not set. That information may include a request to use multiple processors or to run as a preferred guest.

Figure 6:
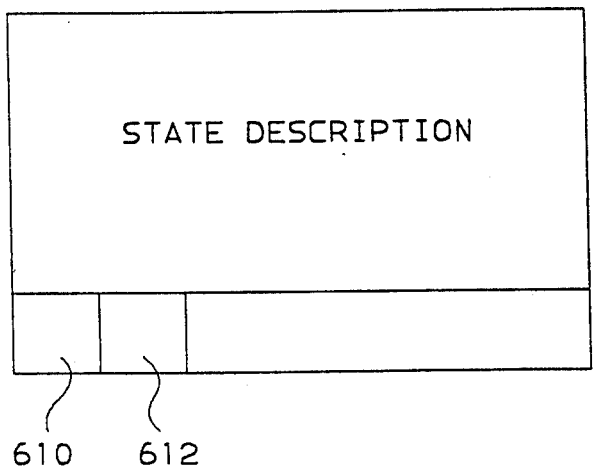
FIG. 6 is an example of the modified state description according to the present invention.

When the SIE instruction is encountered, the microcode tests these indicators and establishes an interpretive execution subset during SIE entry and exit. The host microcode, however, monitors the use of interpretive execution facilities not enabled by the SIE instruction. If the guest attempts to use these facilities, for example, by executing an instruction to turn DAT on, the host interrupts the guest and redispatches it as a non-subset guest. The monitoring to prevent the use of uninitialized facilities is performed with no degradation to performance sensitive instructions. Thus, the reduction in overhead by the use of subset mode is fully realized. FIG. 6 illustrates the use of additional bit indicators in the state description including an indicator for dynamic address translation 610 and one for timing 612.

Figure 7:
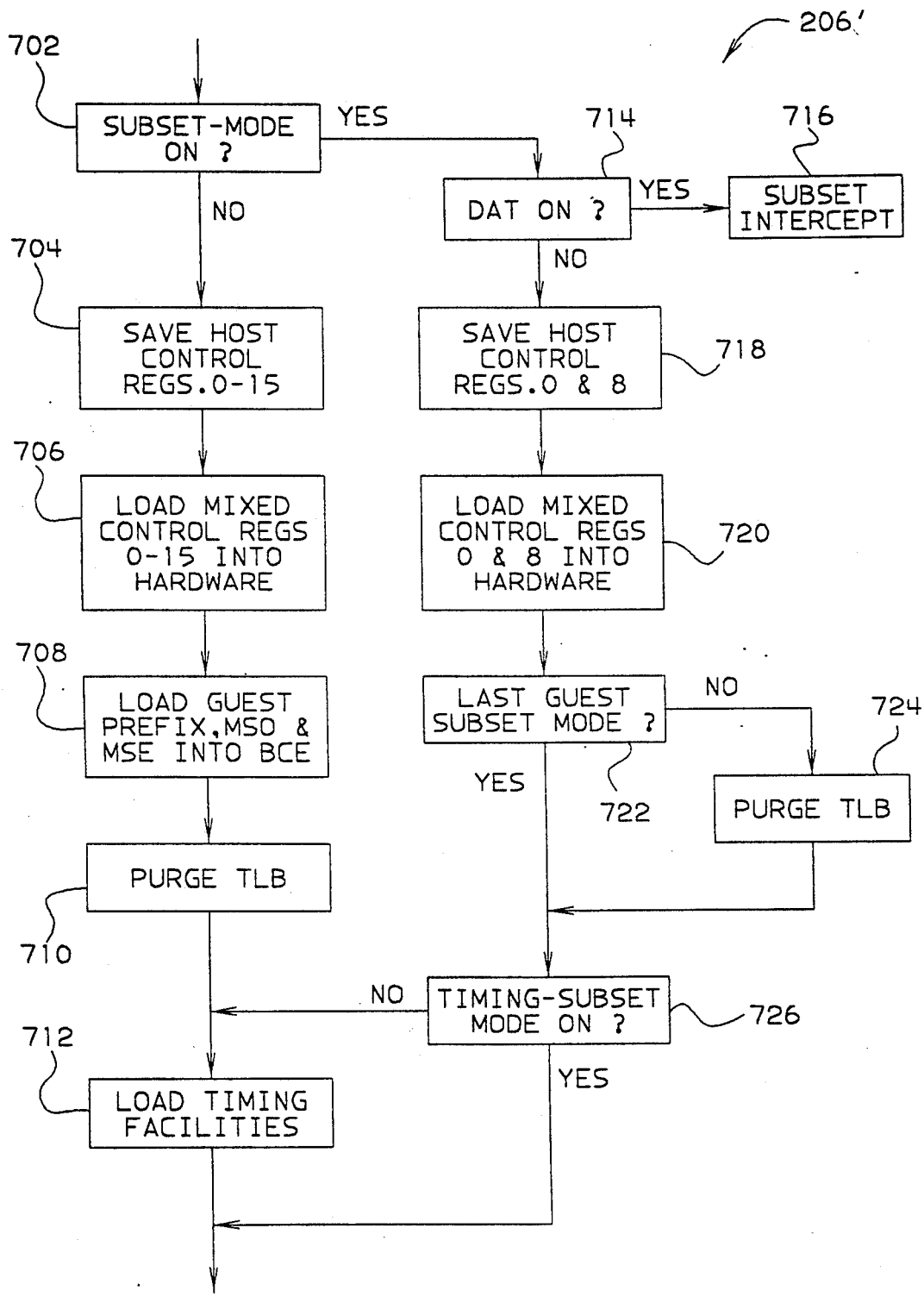
FIG. 7 is a flowchart of SIE entry processing according to the present invention.

A flowchart showing the microcode functional flow in modified SIE entry 206' is shown in FIG. 7. The microcode first tests 702 whether indicator 610 is set on to provide subset mode. If not, the host control registers 0-15 are saved in step 704, the guest control register 0-15 are mixed with the host registers and loaded into the hardware at 706, and the guest address prefix, main storage origin, and main storage extension are loaded into the buffer control element (BCE) 708. The TLB is purged 710 and the timing facilities are loaded 712.

If step 702 determines that the subset mode 610 is on, a check is made of whether the guest expects DAT to be on 714. Since the subset mode requires that DAT be off, a DAT on request causes a subset intercept 716 requiring redispatch of the task as a full interpretive execution guest. If DAT is off, interpretive execution subset can be enabled. Host control registers 0 and 8 are saved at 718 (the other 14 registers are not saved) and mixed registers 0 and 8 are loaded into the hardware at 720. The system next checks to determine whether the last guest executed in subset mode 722. If not, the TLB is purged. If so, the TLB entries are allowed to remain. Finally, the timing mode subset indicator 612 is checked at 726. If timing is not required the timing facility load 712 is bypassed. If timing is required, load 712 occurs.

Figure 8:
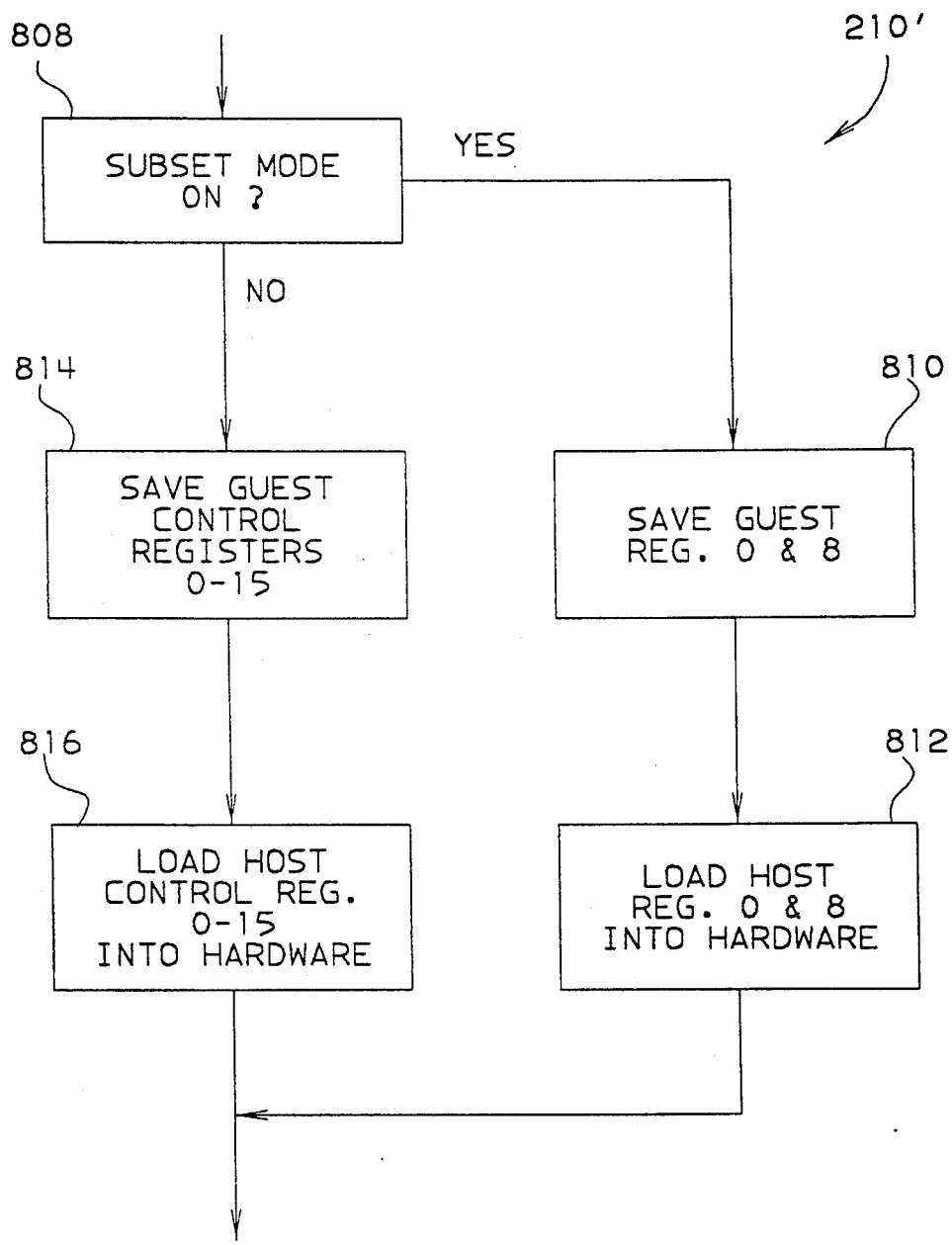
FIG. 8 is a flowchart of SIE exit according to the present invention.

Similar savings are achieved in modified SIE exit 210' shown in FIG. 8. If subset mode is on (test 808) the guest registers 0 and 8 are saved 810 and host register 0 and 8 are loaded 812. If subset mode is not on, all 16 guest registers must be saved 814, and host control registers must be loaded 816.

The subset mode indicator 610 is also loaded into the buffer control element to reduce translation requirements. When the indicator is loaded, the BCE treats all guest real addresses as host virtual addresses. Guest prefix and main storage origin (MSO) are both assumed to be 0, and the main storage extent (MSE) is assumed to be the maximum. The BCE can therefore bypass the steps required to translate the guest real to host virtual saving machine cycles.

The TLB does not need to be purged at SIE entry in subset mode when running consecutive subset mode guests. This is because TLB entries made in subset mode are flagged in the TLB as host entries. A unique host segment table origin (STO) is established for each subset guest and stored in the TLB entry. The system includes hardware for comparing the current host STO entry to the TLB STO before using the TLB entry. Allowing the TLB entries to remain between guest machine dispatches not only saves the time required to purge the entries, but also allows entries to be maintained between guest sessions and reused if not otherwise invalidated.

While the invention has been particularly shown and described with references to preferred embodiments thereof, it will be understood by those skilled in the art that the foregoing and other changes in form and details may be made therein without departing from the spirit and scope of the invention.

What is claimed is:

1. A method of operating virtual machines (VMs) in a data processing system having one or more processors and an electronic storage, a host control program (host) overseeing the system and all VMs in the system, each VM having an associated quest control program (quest) using interpretive execution means on a processor in the system, the method comprising the steps of:

requesting the host to initiate a process for establishing interpretive execution by a VM on a processor, testing by the process for an indication associated with the VM for indicating whether the VM has a subset state, bypassing specified steps in the process if the testing step detects the subset state, but executing the specified steps if the testing step does not detect the subset state, structuring the content of the state description to include a subset indication of whether the process can bypass code for controlling a VM associated with the state description, and the state description further including one or more of bypass-defining indicators including a first indicator to control bypassing a first set of specified steps in the process for providing one function for the VM, and a second indicator to control bypassing a second set of specified steps in the process for controlling another function for the VM, and structuring the first indicator to control bypassing a set of specified steps in the process that provide dynamic address translation for the VM, and structuring the second indicator to control bypassing another set of specified steps in the process that control a timing facility in the system.

2. A method of operating virtual machines (VMs) in a data processing system having one or more processors and an electronic storage, a host control program (host) overseeing the system and all VMs in the system, each VM having an associated quest control program (quest) using interpretive execution means on a processor in the system, the method comprising the steps of:

requesting the host to initiate a process for establishing interpretive execution by a VM on a processor, testing by the process for an indication associated with the VM for indicating whether the VM has a subset state, bypassing specified steps in the process if the testing step detects the subset state, but executing the specified steps if the testing step does not detect the subset state, structuring the content of the state description to include: a subset indication of whether the process can bypass code for controlling a VM associated with the state description, and the state description further including one or more bypass-defining indicators including a first indicator to control bypassing a first set of specified steps in the process for providing one function for the VM, and a second indicator to control bypassing a second set of specified steps in the process for controlling another function for the VM, controlling virtual addressing by the host control program by a state of a host dynamic address translation (DAT) indicator, and controlling virtual addressing by each guest control program by a state of a guest DAT indicator for each guest in a state description associated with the guest, translating host virtual addresses if the host DAT indicator is set on, and translating guest virtual addresses if the guest DAT indicator is set on in an associated state description, storing virtual address translations of the host and guests executing in a processor by using a hardware translation lookaside buffer (TLB) in the processor for containing an entry for each address translation recently performed in the processor, and purging the contents of the TLB for a VM being established by the process if the VM has an associated subset state set on in an associated state description and a last previous guest dispatched on the processor does not have an associated subset state set on in an associated state description.

3. The method of claim 2, further comprising the steps of:

purging the contents of the TLB for a VM being established by the process if the VM does not have an associated subset state set on in an associated state description and a last previous guest dispatched on the processor did have an associated subset state set on in an associated state description.

4. The method of claim 2, further comprising the steps of:

not purging the content of the TLB if a VM being established by the process has a subset state set on for an associated state description and if a last previous dispatch of the processor was for a VM having an associated subset state set on in an associated state description to enable the VM being established to use prior translations stored in the TLB.

5. The method of claim 2, further comprising the steps of:

controlling virtual addressing by the host control program by setting the host DAT indicator to a translation state, and controlling virtual addressing by each guest control program by setting the guest DAT indicator to a non-translation state, structuring each entry in the TLB with a plurality of fields for containing a host or guest logical address and a corresponding real or absolute address, for indicating whether the logical address is a host or guest address, for indicating whether the logical address is a virtual or real address, for indicating a virtual address space for a logical address, and for indicating if the content of the entry is valid or invalid, and setting the indication of the virtual address space to indicate host virtual for guest real fetches made for a VM running with the subset state set on.

* * * * *